United States Patent [19]
Ashida et al.

[11] Patent Number: 5,819,246
[45] Date of Patent: Oct. 6, 1998

[54] NON-LINEAR MODEL AUTOMATIC GENERATING METHOD

[75] Inventors: Hitoshi Ashida, Yokohama; Yoji Taniguchi, Ikeda; Akira Maeda, Yokohama; Tadashi Tenma, Zama, all of Japan

[73] Assignee: Hitachi, Ltd., Tokyo, Japan

[21] Appl. No.: 543,998

[22] Filed: Oct. 17, 1995

[30] Foreign Application Priority Data

Oct. 20, 1994  [JP]  Japan .................................. 6-254997

[51] Int. Cl.$^6$ ...................................................... G06F 15/18
[52] U.S. Cl. ................................................................. 706/25
[58] Field of Search ............................... 395/22, 23, 11, 395/900; 706/25

[56] References Cited

U.S. PATENT DOCUMENTS 5,339,818  8/1994  Baker et al. ............................. 128/677

OTHER PUBLICATIONS

Holmstorm et al., Using additive noise in back–propagation training, IEEE transactions on neural networks, vol. 3, pp. 24–38, Jan. 1992.

Abdulbary et al., Application of connectionist model to controlling a MSF desalination plant, Proceedings of the third IEEE conference on control applications, pp. 1821–1822, Aug. 26, 1994.

Sudharsanan et al., Self–tuining adaptive control of multi–input, multi–output networks with application to synchronous power generators, 1993 IEEE International Conference on Neural Networks, pp. 1307–1312, Apr. 1, 1993.

*Primary Examiner*—Allen R. MacDonald
*Assistant Examiner*—Sanjiv Shah
*Attorney, Agent, or Firm*—Fay Sharpe Beall Fagan Minnich & McKee

[57] ABSTRACT

The present invention is intended to automatically select least required input items for a non-linear model and improve an efficiency of building up the non-linear model. For building up, for example, a neural network as the non-linear model, a group-by rule 105 and dividing point information 106 of the data are automatically generated by a group-by rule induction device 104 by selecting a dividing method option 101 and a group selection information 103 if data for learning 101 is given. An initial neural network model generating device 107 automatically generates an initial neural network model 108 from the group-by rule 105. The initial neural network model is learned in a neural network model learning device 111 and outputted as a post-learning neural network model 112. Data for learning with group information 110 which is the data for learning is generated in a data classification device 109 by using data for learning 102, group-by rule 105 and dividing point information 106. Input-output variables can be automatically selected from the data for learning according to selection of the group and a neural network model of respective groups can be built up.

17 Claims, 18 Drawing Sheets

FIG. 3

| DATA | ATTRIBUTE 1 | ATTRIBUTE 2 | ATTRIBUTE 3 | ..... | ATTRIBUTE K | | ATTRIBUTE N |
|---|---|---|---|---|---|---|---|
| 1 | X11 | X12 | X13 | | X1K | | X1N |
| 2 | X21 | X22 | X23 | | X2K | | X2N |
| .... | | | | Xij | | | |
| M | XM1 | XM2 | XM3 | | XMK | | XMN |
| | INPUT 1 | — | INPUT 2 | ..... | INPUT n | — | OUTPUT |

FIG. 4

| NUMBER OF DIVISIONS | LABEL |
|---|---|
| 2 | SMALL, LARGE |
| 3 | SMALL, INTERMEDIATE, LARGE |
| 4 | SMALL, SLIGHTLY SMALL, SLIGHTLY LARGE, LARGE |
| 5 | SMALL, SLIGHTLY SMALL, INTERMEDIATE, SLIGHTLY LARGE, LARGE |

FIG. 9

| DATA | ATTRIBUTE 1 | ATTRIBUTE 2 | ATTRIBUTE 3 | ..... | ATTRIBUTE K | ..... | ATTRIBUTE N |
|---|---|---|---|---|---|---|---|
| 1 | X11 | X12 | X13 | | X1K | | X1N |
| 2 | X21 | X22 | X23 | | X2K | | X2N |
| ....... | | ..... | | $X_{ij}$ | | | |
| M | XM1 | XM2 | XM3 | | XMK | | XMN |

| INPUT 1 | — | INPUT 2 | ..... | INPUT n | OUTPUT |
|---|---|---|---|---|---|
| | | | | | — |

| GROUP | G1 | G2 | ....... | GM |
|---|---|---|---|---|

FIG. 12

| CUSTOMER NO. | ANNUAL INCOME | LENGTH OF SERVICE | AGE | DEPENDENTS | TYPE OF BUSINESS | . . . . | REPLY |
|---|---|---|---|---|---|---|---|
| 0000001 | C | C | 41 | 1 | A | | YES |
| 0000002 | B | B | 38 | 2 | A | . . . . | NO |
| 0000003 | B | B | 35 | 2 | B | | NO |
| 0000004 | A | A | 27 | 0 | A | . . . . | YES |

FIG. 13

| DATA ITEM \ LABEL | A | B | C | D |
|---|---|---|---|---|
| ANNUAL INCOME | [0, 500] | [500, 1000] | [1000, +∞] | |
| LENGTH OF SERVICE | [0, 1] | [1, 5] | [5, +∞] | |
| TYPE OF BUSINESS | MANUFACTURER | FINANCE | TRADING | OTHERS |
| ... | | | | |

FIG. 14

| AREA NO. | ANNUAL INCOME | LENGTH OF SERVICE | AGE | DEPENDENTS | TYPE OF BUSINESS | . . . . | RESPONSE RATIO |
|---|---|---|---|---|---|---|---|
| 0000001 | B | C | 41 | 0.5 | A | | 0.5 |
| 0000002 | B | B | 38 | 1.2 | A | . . . . | 1.3 |
| 0000003 | B | B | 35 | 2.2 | B | | 6.0 |
| 0000004 | A | A | 27 | 0.3 | A | . . . . | 2.5 |

| | INPUT 1 | INPUT 2 | INPUT 3 | INPUT 4 | INPUT 5 | — . . . | OUTPUT |

FIG. 15

| AREA NO. | ANNUAL INCOME | LENGTH OF SERVICE | AGE | DEPENDENTS | TYPE OF BUSINESS | . . . . | RESPONSE RATIO |
|---|---|---|---|---|---|---|---|
| 0000001 | B | C | INTERMEDIATE | SMALL | A | | LOW |
| 0000002 | B | B | INTERMEDIATE | INTERMEDIATE | A | . . . . | LOW |
| 0000003 | B | B | INTERMEDIATE | LARGE | B | | HIGH |
| 0000004 | A | A | LOW | SMALL | A | . . . . | HIGH |

| | INPUT 1 | INPUT 2 | INPUT 3 | INPUT 4 | INPUT 5 | — · · · | OUTPUT |

FIG. 16

RULE __ HIGH __ 1
IF LENGTH OF SERVICE = A OR C
   NUMBER OF DEPENDENTS = SMALL OR INTERMEDIATE
THEN RESPONSE RATIO = HIGH (0.88)
                     LOW  (0.12)

RULE __ HIGH __ 2
ELSE IF SCALE OF THE COMPANY = C
THEN RESPONSE RATIO = HIGH (0.78)
                     LOW  (0.22)

RULE __ HIGH __ 3
ELSE IF AGE = LOW
THEN RESPONSE RATIO = HIGH (0.76)
                     LOW  (0.36)

RULE __ LOW __ 1
IF SCALE OF THE COMPANY = A OR B
   AGE = INTERMEDIATE OR HIGH
   NUMBER OF FORMER MEMBERS = LARGE
THEN RESPONSE RATIO = HIGH (0.25)
                     LOW  (0.48)

RULE __ LOW __ 2
ELSE IF DEPENDENTS = LARGE
THEN RESPONSE RATIO = LOW  (0.24)
                     HIGH (0.76)

FIG. 17

| RULE NO. | ANNUAL INCOME | LENGTH OF SERVICE | AGE | DEPENDENTS | TYPE OF BUSINESS | ..... | RESPONSE RATIO | GROUP |
|---|---|---|---|---|---|---|---|---|
| 0000001 | | A, C | | SMALL, INTERMEDIATE | | ..... | HIGH | HIGH |
| 0000002 | | | | | | ..... | HIGH | HIGH |
| 0000003 | | | SMALL | | | ..... | HIGH | HIGH |
| 0000004 | | | INTERMEDIATE, LARGE | | | | LOW | LOW |
| | | | | | | ..... | LOW | LOW |

FIG. 19

| AREA NO. | ANNUAL INCOME | LENGTH OF SERVICE | AGE | DEPENDENTS | TYPE OF BUSINESS | . . . . | RESPONSE RATIO | GROUP |
|---|---|---|---|---|---|---|---|---|
| 0000001 | B | C | 41 | 0.5 | A | | 0.5 | LOW |
| 0000002 | B | B | 38 | 1.2 | A | . . . . | 1.3 | LOW |
| 0000003 | B | B | 35 | 2.2 | B | | 6.0 | HIGH |
| 0000004 | A | A | 27 | 0.3 | A | . . . . | 2.5 | HIGH |

| | INPUT 1 | INPUT 2 | INPUT 3 | INPUT 4 | INPUT 5 | | OUTPUT | |

FIG. 20

| | | |
|---|---|---|
| INPUT VARIABLE | LENGTH OF SERVICE | { 0, 0.5, 1 } |
| | DEPENDENTS | [ 0, 1 ] |
| | SCALE OF THE COMPANY | { 0, 0.5, 1 } |
| | AGE | [ 0, 1 ] |
| | NUMBER OF FORMER MEMBERS | [ 0, 1 ] |
| OUTPUT VARIABLE | RESPONSE RATIO | { 0, 1 } |

NON-LINEAR MODEL AUTOMATIC GENERATING METHOD

BACKGROUND OF THE INVENTION

The present invention relates to a method for automatically generating a non-linear model from data for learning (i.e. learning data) including accumulated numerical data and, more particularly, a method for automatically generating a neural network model.

For generating the non-linear model, it is important to select input variables for the non-linear model. The following three factors for selecting input variables of the non-linear model can be taken into account.

(1) Selection of appropriate input variables through utilization of expertise or trial and error A non-linear model is built up (i.e. generated) by selecting input variables in accordance with expertise if available. If expertise is unavailable, the input variables are appropriately selected to build up (i.e. generate) a model and learning is carried out. If learning of the model is not completed or there is a deficiency that a general-purpose applicability of the model is not recognized as a result of verification, the input variables are selected again and the learning is repeated.

(2) Selection of input variables by a statistical method

Correlation coefficients of respective input variables and output variables are obtained and those correlation coefficients with large absolute values are selected as required as input variables. The number of input variables is determined through trial and error.

(3) Selection of input variables for the information system according to subordination of attributes The input variables are selected according to the subordination of attributes. Data are only discrete values for which symbols are substituted.

SUMMARY OF THE INVENTION

As described in (1), if the input variables for the non-linear model are selected by utilizing the expertise or through trial and error, the efficiency of model construction is unsatisfactory and, if appropriate input variables are not selected, the model learning will not be completed. A first object of the present invention is to improve the efficiency of building up the non-linear model by automatically selecting appropriate input variables in view of the characteristics of data for learning and building up the non-linear model.

Selection of (2) is for evaluating a strength of linear correlation of input variables and output variables by using the correlation coefficients and selecting several input variables from those with stronger linear correlation. However, while the non-linear model is intended to represent the non-linear correlation of a plurality of inputs and one output to be covered, primary correlation coefficients of the input variables and the output variables are obviously insufficient for such representation.

A second object of the present invention is to select appropriate input variables for the non-linear model with a number of inputs by dividing the domains for respective input variables into a plurality of regions and selecting the input variables according to a relationship between a subspace formed by a combination of divided regions of a plurality of input variables and an output and to easily represent an input-output relationship with a strong non-linearity.

Applicable data in (3) is only discrete values for which symbols are substituted and numerical values cannot be used. A third object of the present invention is to enable selection of appropriate input variables even from numerical data.

In generation of a typical non-linear model as described in (1), only one model is finally generated and therefore trial and error is required and the number of times of learning is increased to represent the input-output relationship with a strong non-linearity. A fourth object of the present invention is to improve the efficiency of model generation and the accuracy of inference by building up a plurality of models and an inference device which utilizes a plurality of non-linear models.

To attain the first object described above, the non-linear model automatic generating method according to the present invention is adapted to extract the characteristics of data for learning in a rule format by group-by rule induction processing, pick up input-output variables from the selected rule, reduce the number of times of trials and errors in selection of input variables when in building up a non-linear model, and improve an efficiency of building up the non-linear model.

For example, a neural network model automatic generating method according to the present invention is adapted to select the input variables from the characteristics of the data for learning by group-by rule induction processing and initial neural network model generating processing, reduce the number of times of trials and errors in selection of the input variables in building up a neural network model, and improve an efficiency of building up the neural network model.

To attain the second object described above, a non-linear model automatic generating method according to the present invention is adapted to represent an input-output relationship of respective subspaces in the rule format by group-by rule induction processing and easily represent an input-output relationship having a strong non-linearity.

To attain the third object described above, a non-linear model automatic generating method according to the present invention is adapted to automatically convert numerical data to an instance table which is symbolic data by label presenting processing in group-by rule induction processing.

To attain the fourth object described-above, a non-linear model automatic generating method according to the present invention is adapted to extract the characteristics of the data for learning in the rule format by group-by rule induction processing, pick up the input variables of each group from the selected group according to group selection information, and build up the non-linear model for each group.

For example, a neural network model automatic generating method, which is an example of the non-linear model, is adapted to build up a plurality of initial neural network models for respective groups according to the group selection information by group-by rule induction processing and initial neural network model generating processing and to learn the initial neural network model by using the data for learning with group information which is classified for each group by the data classification device.

With respect to the first object of the invention, the trial and error in selection of the input variables for building up the non-linear model is reduced as if it can be obviated and the efficiency of building up the non-linear model is improved by selecting the group-by rule through the group-by rule induction processing and picking up the input-output variables from the selected rule.

Particularly, in building up a neural network model, the group-by input-output variables can be automatically selected, the neural network model can be built up and learning can be carried out by group-by rule induction processing, initial neural network model generating processing and neural network model learning processing and therefore the input variables of the neural network model need not be selected through trial and error and the model building-up efficiency is improved.

With respect to the second object of the invention, in the processing for selecting the input-output variables, an input-output relationship having a strong non-linearity is easily represented by dividing respective input variables into a plurality of regions by using the label presenting processing and selecting the relationship between respective subspaces and output variables by using rule extraction processing.

With respect to the third object of the invention, in group-by rule induction processing, real number data can be used by label presenting processing and converting the real number data to the instance table which is the symbolic data.

With respect to the fourth object of the invention, the characteristics of the data for learning are selected in the rule format by group-by rule induction processing, the input variables are picked up for each group from the selected rule according to the group selection information, a plurality of models are built up in response to a complexity of the model by building up the non-linear model for each group, and thus a high precision model can be efficiently built up.

Particularly, in building up the neural network model, the group-by rule is induced by group-by rule induction processing, the input-output variables are selected for respective groups by utilizing input-output variable selection processing in the initial neural network model generating processing, and an initial neural network model is generated for respective groups by utilizing the neural network model structure decision processing. In addition, a plurality of neural network models can be built up and learning can be carried out with respect to respective models by carrying out the learning for the respective groups by using the neural network model learning processing according to the data for learning with group information which is obtained by dividing the data for learning in data classification processing and therefore a high precision model can be efficiently built up.

BRIEF DESCRIPTION OF THE DRAWINGS

FIG. 3 is data for learning for use in an embodiment of the present invention;

FIG. 4 is a default value for each dividing point of labels allocated to the divided segments included in the dividing method option in an embodiment according to the present invention;

FIG. 9 is information presenting the data for learning with group information used in the embodiment according to the present invention;

FIG. 12 is information presenting customer data used in the embodiment according to the present invention;

FIG. 13 is a table presenting the meanings of respective labels of customer data used in the embodiment according to the present invention;

FIG. 14 is information presenting the data for learning of area data used in the embodiment according to the present invention;

FIG. 15 is an instance table converted from the data for learning shown in FIG. 14 by the label presenting device, used in the embodiment according to the present invention;

FIG. 16 is an RI (rule induction) rule induced by an RI device in accordance with the instance table shown in FIG. 15, used in the embodiment according to the present invention;

FIG. 17 is information presenting the RI rule shown in FIG. 16, used in the embodiment according to the present invention;

FIG. 19 is information presenting the data for learning with group information used for learning the neural network model shown in FIG. 18, used in the embodiment according to the present invention; and FIG. 20 is information presenting the data format post-translating data for learning obtained by converting the data for learning with group information shown in FIG. 19 into a format applicable to the weighting factor learning device by the data format translating device.

DESCRIPTION OF THE PREFERRED EMBODIMENTS

Embodiments of the present invention are described in detail below.

Figure 1:
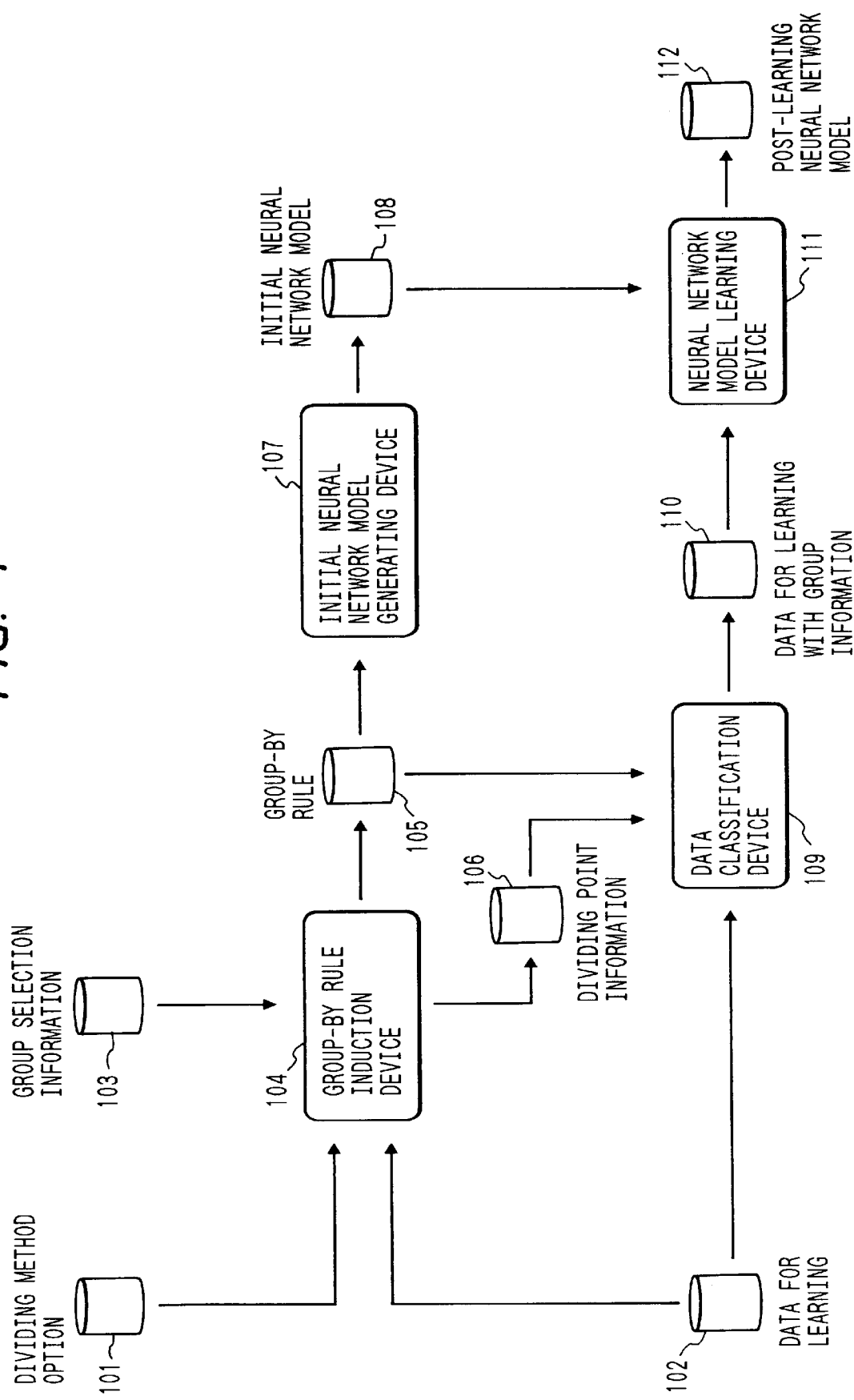
FIG. 1 is a configuration diagram of a neural network model automatic generating device according to the present invention.

FIG. 1 a block configuration diagram of a device for automatically generating a neural network model which is a type of a non-linear model to which the present invention applies.

This device is used to select at least one input and only one output from data for learning applicable to building up of a neural network model and a neural network model presenting a relationship of these input and output is built up. A group-by rule induction device 104 processes a dividing method option 101, data for learning 102 and group selection information 103 as inputs and outputs a group-by rule 105. An initial neural network model generating device 107 processes the group-by rule 105 as the input and outputs an initial neural network model 108. A data classification device 109 processes the data for learning 102, the group-by rule 105, and dividing point information 106 as inputs and outputs data for learning with group information 110. A neural network model learning device 111 processes the initial neural network model 108 and the data for learning with group information 110 as inputs and outputs a post-learning neural network model 112.

The group-by rule induction device 104 outputs a rule representing an input-output relationship between at least one input and only one output selected in the data for learning to respective selected groups. For example, the group-by rule induction device 104 comprises a label presenting device 201, a rule induction device 203 and a rule group generating device 205.

Figure 2:
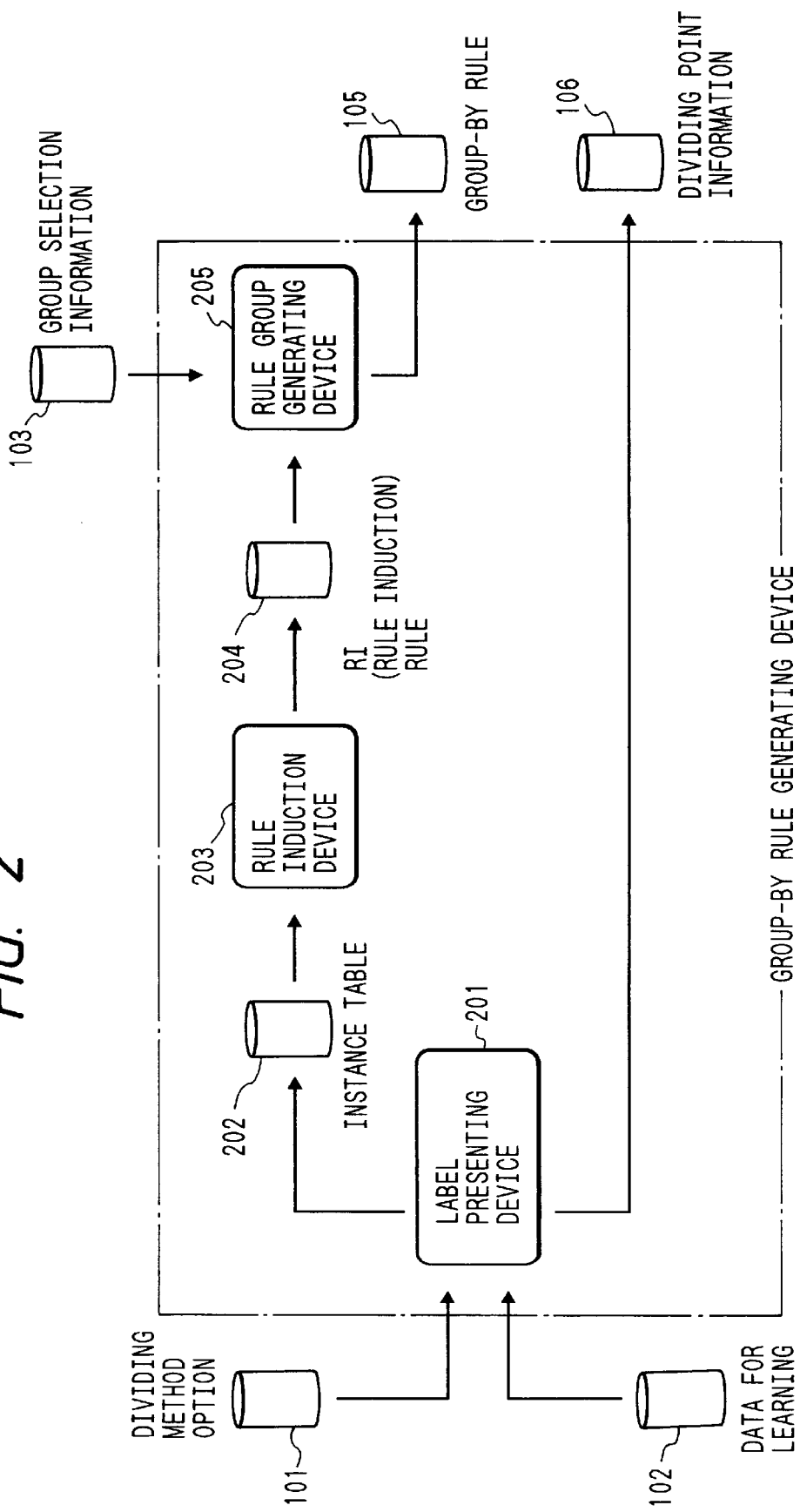
FIG. 2 is a configuration diagram of a group-by rule induction device according to the present invention.

In FIG. 2, the label presenting device 201 allocates labels such as "small," "intermediate" and "large" to respective numerical data of the data for learning 102. The attribute values of the attributes of the data for learning 102 are assumed to be numerical data or label data (symbolic data) and the label presenting device 201 converts the numerical data of the attribute values in the data for learning to the label data. Those data to which the labels are allocated are referred to as "label data." The label to be given to the label of the output variable is referred to as "class."

A basic idea for presenting the label is to delimit numerical data at an appropriate position for respective input variables and allocate the labels to respective segments. The position where the data is delimited is referred to as the data dividing point. In other words, information necessary for generating the label data is the data for learning 102 and the dividing method option 101 for specifying a method of deciding the label, number of divisions and data dividing position.

The data for learning 102 is given in the format shown in FIG. 3 and simultaneously contains numerical values and symbols. The data for learning 102 is huge in volume and includes missing values and it is therefore difficult to grasp the characteristics. In this case, it is assumed that the missing values are presented as special values which can be discriminated from other values. For example, the missing value can be FF . . . FF in the hexadecimal notation. What attributes are to be used as the input and output in the final line is determined by the user. N denotes the total number of attributes included in the data for learning, M denotes the number of data, and Xij denotes the j-th attribute value of the i-th data. In this example, attribute 1 is input 1, attribute 3 is input 2, attribute k is input n, and attribute N is an output. n denotes the number of input items used by the rule induction device.

Figure 5:
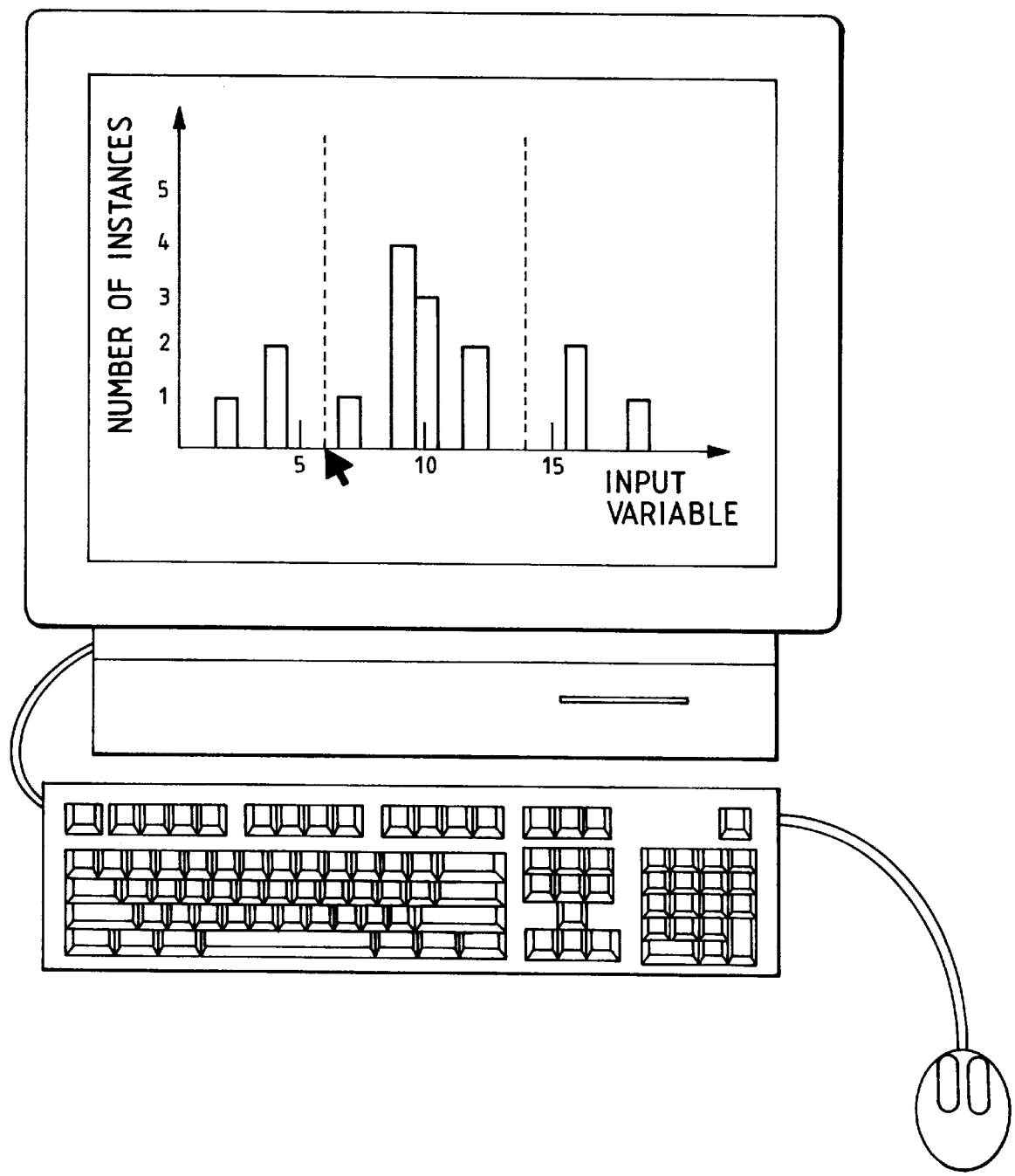
FIG. 5 is an example of a histogram of the number of instances for each input variable to be used in a format by which the user determines the dividing point in the embodiment of the present invention.

The dividing method option 101 includes a label which represents the numerical data of a given segment with a symbol, the number of divisions of respective input variables and a method for deciding the dividing position. Though the label name as shown in FIG. 4 is defaulted for each number of division, it can be specified by the user. For example, if the atmospheric temperature is used as an input variable, the label names of respective segments such as "high," "intermediate" and "low" can be selected as required by the user. As the method for determining the dividing position, the histogram of the number of instances for inputs shown, for example, in FIG. 5 is displayed for each input variable and the user determines the number of divisions and the dividing positions referring to the data distribution. In FIG. 5, the dotted line denotes the dividing positions. The dividing position is designated, for example, on the histogram on display device by using a pointing tool such as a mouse.

An instance table 202 is the label data translated from the data for learning 102 by the label presenting device 201.

The rule induction device 203 is for selecting the rule from the instance table.

An RI rule 204 is a rule outputted in "IF . . . , THEN~" or "ELSE IF . . . , THEN~" format from the rule induction device 203. The rule group generating device 205 classifies the RI rule 204 for respective selected rule groups and outputs the group-by rule 105. In this case, the group selection information 103 includes how the RI rule is grouped. The groups include three types such as the rule-by group, the output class-by group and the total group.

Figure 6:
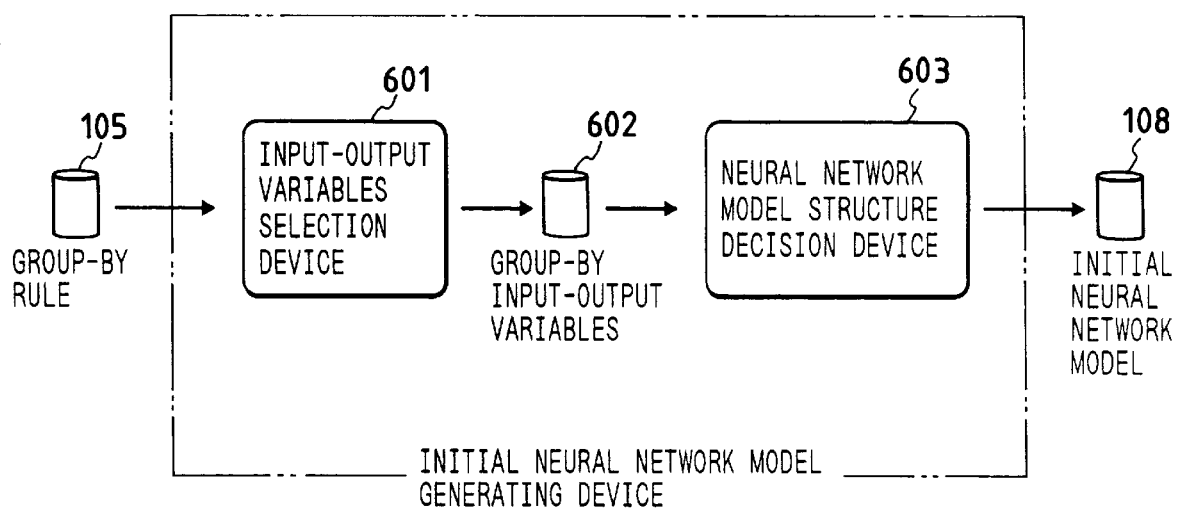
FIG. 6 is a configuration diagram of an initial neural network model generating device to be used in the embodiment of the present invention.
Figure 7:
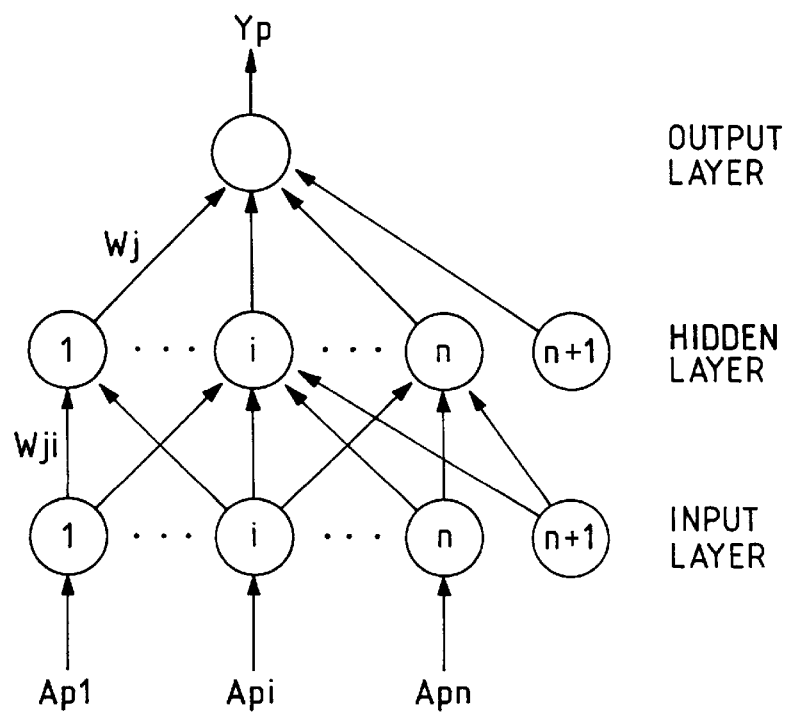
FIG. 7 is a schematic diagram of a perceptrons type 3-layer neural network model for a plurality of inputs and one output to be used in the embodiment of the present invention.

The initial neural network model generating device 107 automatically generates the neural network model from the group-by rule 105. For example, as shown in FIG. 6, the initial neural network model generating device 107 comprises an input-output variable selection device 601 and a neural network model structure decision device 603. The input-output variable selection device 601 processes the group-by rule 105 as input and outputs the group-by input-output variables 602. The neural network model structure decision device 603 processes the group-by input-output variables 602 as input and outputs the initial neural network model 108. The structure of the initial neural network model is, for example, a perceptrons three-layer neural network model with a plurality of inputs and one output as shown in FIG. 7 and the number of neurons of the hidden layer is the same as that of the input layer.

An input-output relationship of this neural network model when n-dimension vector Ap= (Api, . . . , Apn) is entered is defined as shown below.

Input layer: $Y_{pi}=A_{pi}$, i=1, 2, . . . , n
$Y_{pi}=C_1$, i=n+1
Hidden layer: $Y_{pi}=f(NET_{pj})$, j=1, 2, . . . n
$NET_{pj}=\Sigma W_{ji}Y_{pi}$, j=1, 2, . . . , n
$Y_{pj}=C_2$, j=n+1
Output layer: $Y_p=f(NET_p)$
$NET_p=\Sigma W_j Y_{pj}$ In connection with the above, Ypk is an output of the k-th neuron of the p-th layer, f () is a sigmoid function, Wji is a real number indicating a coupling strength of the i-th neuron of the input layer and the j-th neuron of the hidden layer, and Wj is real number indicating a coupling strength of the j-th neuron of the hidden layer and the output layer. C1 and C2 are real numbers as threshold values. Σ is a sum of i=1, . . . , n+1 in the hidden layer and a sum of j=1, . . . , n+1 in the output layer.

Figure 8:
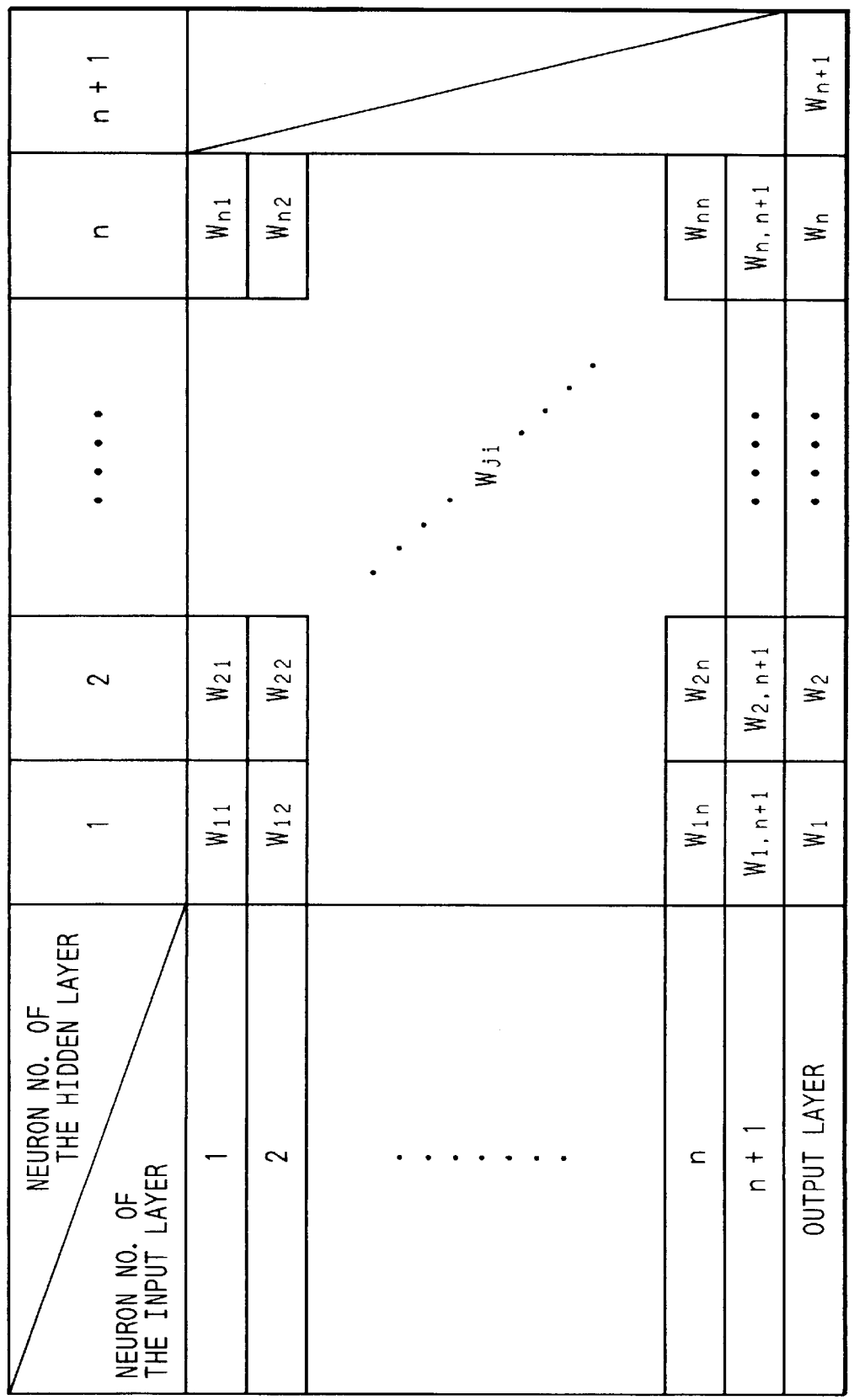
FIG. 8 is information denoting a weighting factor between the neurons of the neural network model to be outputted from the neural network model structure decision device used in the embodiment according to the present invention.

The initial neural network model 108 outputted from the initial neural network model generating device 107 is presented in the format shown in FIG. 8. In the initial neural network model 108, all of Wji (i=1, . . . , n+1, j=1, 2, . . . , n) are random numbers of natural numbers of 0 to 1, both including.

The data classification device 109 classifies the data for learning for each selected group. Concretely, a row indicating the group is added to the right side of the final row of the data for learning as shown in FIG. 9.

The neural network model learning device 111 learns a weighting factor between neurons of the initial neural network model of each group according to a back propagation method by using the data for learning with group information 110 and outputs a post-learning neural network model 112.

Figure 10:
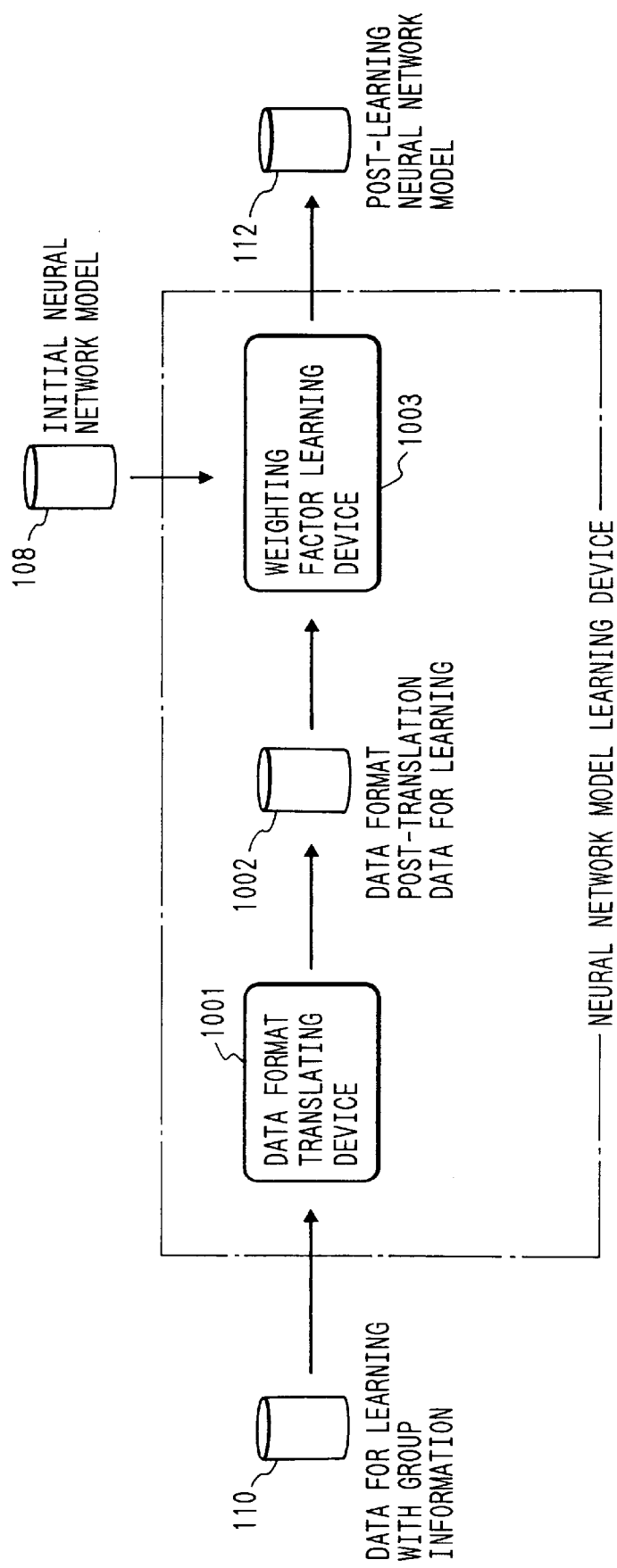
FIG. 10 is a configuration diagram of the neural network model learning device used in the embodiment according to the present invention.

The neural network model learning device 111 comprises, for example, a data format translating device 1001 and a weighting factor learning device 1003 as shown in FIG. 10. In the neural network model learning device 111, the data for learning is changed to the values suitable for learning by the data format translating device 1001. All numerical data is standardized to the values of the segment [0, 1] and the symbolic data is also translated to the real numbers included in the segment [0, 1]. For example, the numerical data is translated to one of [0, 1] if the numerical data is represented with two labels and [0, 0, 5, 1] if the numerical data is represented with three labels. In the weighting factor learning device 1003, the initial neural network model of each group is learned by using only the data belonging to the respective groups in the data format post-translating data for learning.

Figure 11:
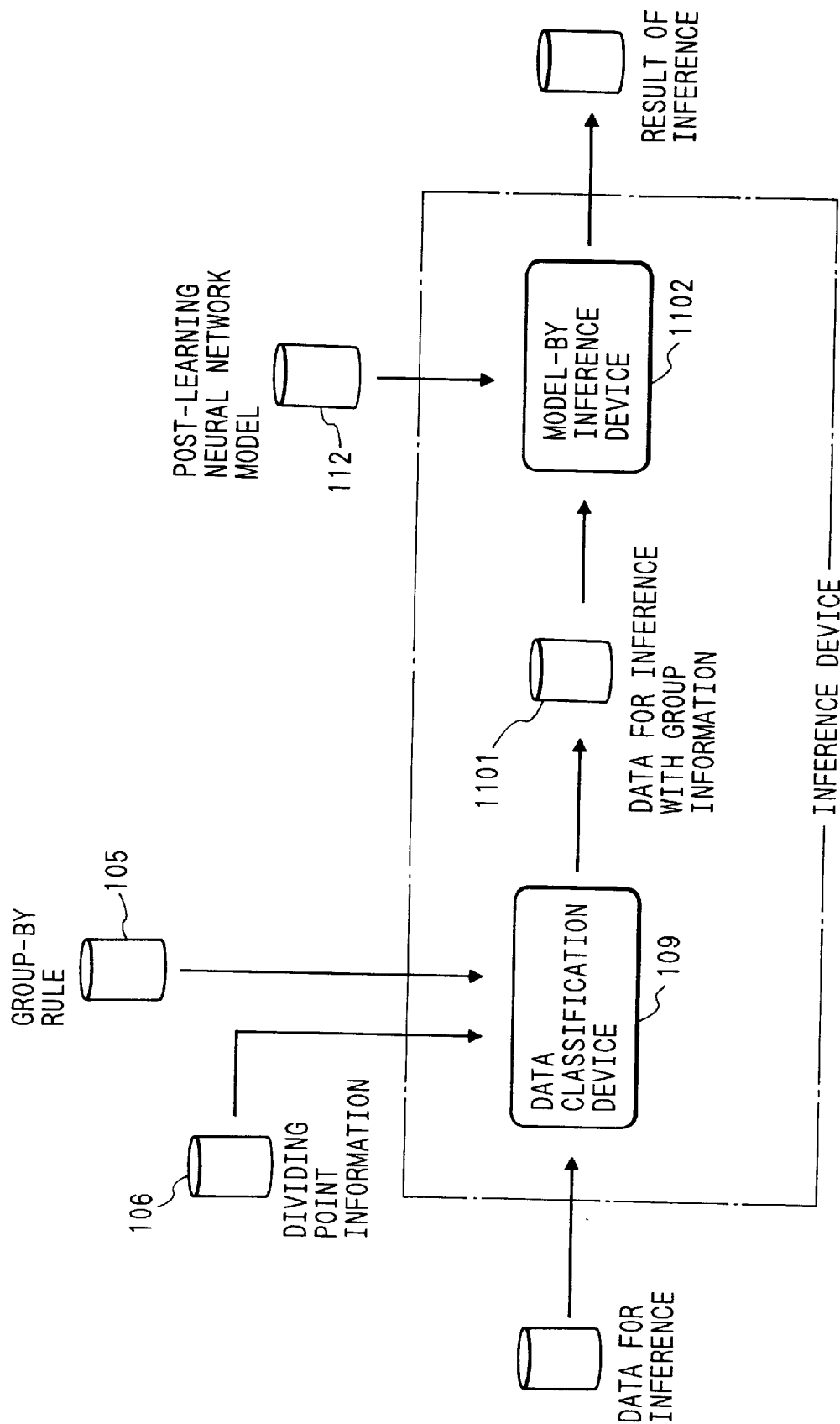
FIG. 11 is an inference device used in the embodiment according to the present invention.

For using the generated post-learning neural network model in the inference of new input data, a data inference device shown in FIG. 11 is used. In this case, the data classification device 109 processes the data for inference as input instead of the data for learning. A model-by inference device 1002 processes the data for inference with group information and the post-learning neural network model as inputs and outputs the result of inference by using the post-learning neural network model of each group.

The operation of the above-described neural network model automatic generating device is described referring to selection of delivery areas for direct mails by a department store. A certain department store sends every year the direct mails which recommend the member's cards to prospective customers living in Tokyo but the average response ratio is unsatisfactory. Therefore, a neural network model for forecasting the response ratio by using the data obtained in the past is built up. The response ratio of the direct mails to those areas to which the direct mails have not been sent is also forecasted.

The data of individual customers is prepared in the format shown in FIG. 12. The meanings of labels A, B, C and D shown in FIG. 12 are shown in FIG. 13 Personnel in charge of sales prepares the data in the format shown in FIG. 14 as the data for learning 102 for respective business areas originally determined by the department store, according to the individual data. The label presenting option and the option 101 (refer to FIG. 1) related to the rule induction device are entered as the user selection information. Since appropriate input variables are selected by the neural network model automatic generating device, the personnel in charge of sales need not strictly select the input attributes and can select all probable items.

The data for learning shown in FIG. 14 simultaneously includes the label data and the numerical data. The label data is used as it is and the numerical data is presented with labels. With respect to the user selection information, "3" is used as the number of divisions for the input variables and "2" for the output variables, "small," "intermediate" and "large" are used as the label for the input variables, and "high" and "low" are used as the label for the output variables. An instance table 202 given with the labels is shown in FIG. 15. The RI rule 204 selected by the rule induction device 203 is shown in FIG. 16. An inconsistent instance is included in the instance table and therefore there are two conclusion parts of the respective rules. The number recorded at the right side of each conclusion part denotes the percentage of instance consistent with conclusion parts to all instances which satisfy the rule conditions.

In this case, if the output class-by information is selected as the group selection information, the group-by rule induction device 104 generates the output class-by rule. The output class-by rule is described in the format shown in FIG. 17. Since the output class-by rule is induced in the rule induction device, the class to be noted is the output class.

Figure 18:
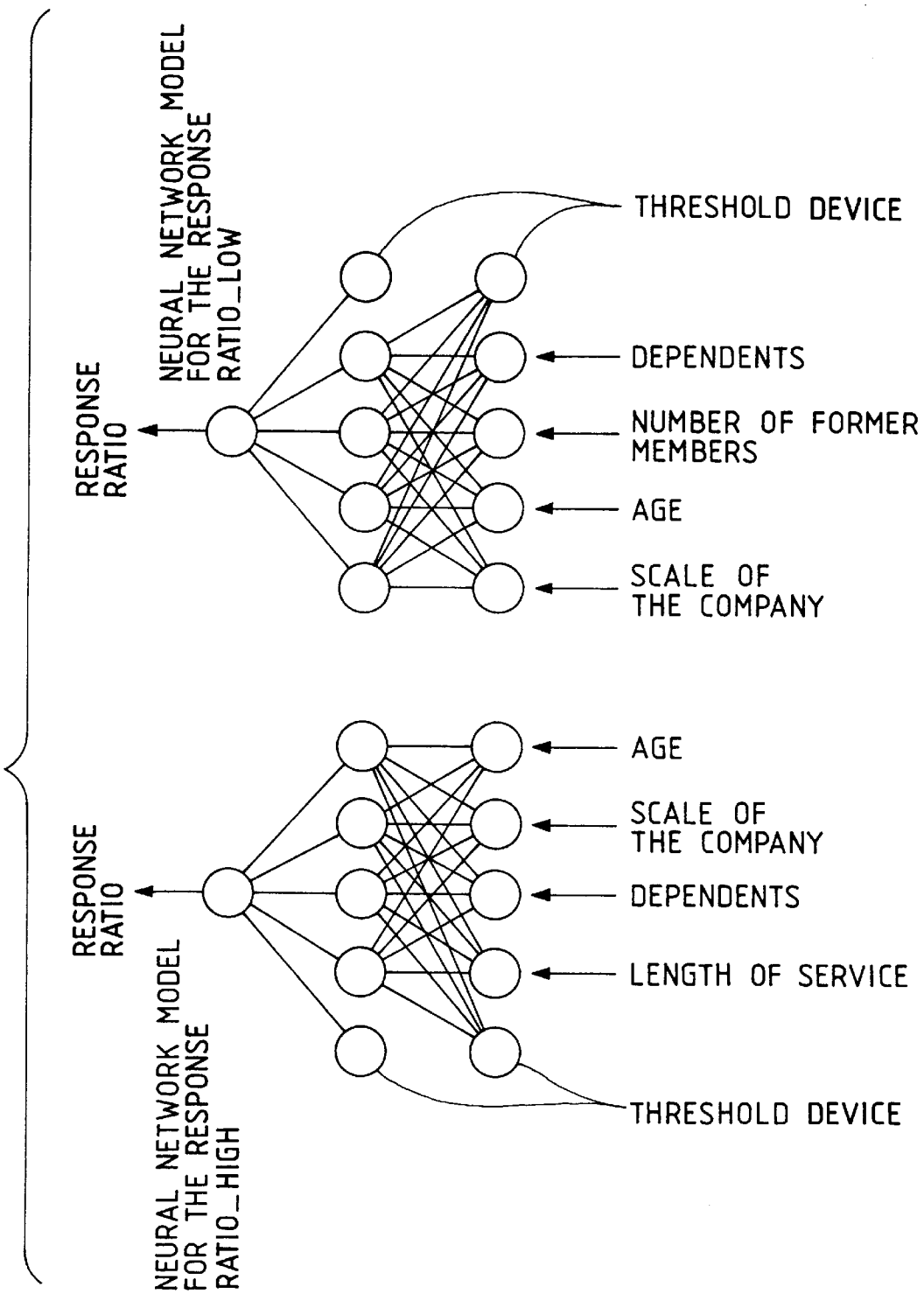
FIG. 18 is a initial neural network model generated based on the RI rule shown in FIG. 17, used in the embodiment according to the present invention.

The structure of the initial neural network model 108 to be determined by the initial neural network model generating device 107 is as shown in FIG. 18. The weights between the devices are random numbers of natural numbers of 0 to 1, both including.

The data for learning with group information 110 to be used in the neural network model learning device 111 is shown in FIG. 19. The group-by data for learning is translated to appropriate values for learning by the data format translating device 1001 shown in FIG. 10. In this case, the data format translating device 1001 translates the data according to the data translating table shown in FIG. 20. The integral values of the dependents, ages, and the number of former members are divided by the respective maximum values and standardized into continuous values of 0 to 1, both including. For the length of service and the scale of company, the labels of "small," "intermediate" and "large" are respectively allocated to 0, 0.5 and 1. As the response ratio, "low" and "high" are allocated to 0 and 1, respectively. The initial neural network model 108 is learned according to the data in the translated format and the post-learning neural network model (after learning) 112 is obtained.

According to the embodiments of the present invention, the neural network model can be built up even for a system for which the input variables cannot be definitely determined, by automatically selecting the input variables. The user selects the trade off of the versatility and accuracy of the model by selecting the group.

The output of the data which is unknown can be forecasted by using the post-learning neural network model, the group-by rule and the dividing point information.

The present invention provides the following effects.

(1) The input-output variables are automatically selected from the data for learning and the non-linear model is generated and therefore the time spent in trials and errors in building up the non-linear model is reduced.

(2) Unnecessary input variables are not used and therefore learning of the neural network model can be speeded up.

(3) Three kinds of non-linear models, that is, the rule-by model, the output class-by model and the total model, can be built up by selecting the group and therefore the user can select the model in view of the trade-off of the versatility and accuracy.

(4) The generated neural network model can be used for inference.

What is claimed is:

1. A method of automatically generating a non-linear model for generating a non-linear model of a neural network, comprising steps of:

selecting characteristics of learning data to be used for learning a non-linear model as a group-by rule through a group-by rule induction processing;

picking up input-output variables from the selected rule; and generating a non-linear model of m inputs and an n output ($m \geq 2$, $n \geq 1$) by using the picked-up input-output variables.

2. A method of automatically generating a neural network model for generating a neural network model, comprising steps of:

selecting characteristics of learning data to be used for learning a neural network model as a group-by rule through a group-by rule induction processing;

picking up input-output variables from the selected rule;

generating an initial neural network model for determining a structure of the neural network model by using the picked-up input-output variables; and generating a neural network model by learning the initial neural network model according to said learning data.

3. A method of automatically generating a neural network model for generating a neural network model, comprising steps of:

inducing characteristics of learning data to be used for learning said neural network model as a group-by rule through a group-by rule induction processing;

generating an initial neural network model for determining a structure of the neural network model by the input-output variables, which are picked up from said group-by rule;

generating learning data with group information by classifying said learning data for respective groups; and learning said initial neural network model according to the classified learning data.

4. A method of automatically generating a neural network model according to claim 3, wherein said step of inducing comprises steps of:

translating data of numerical attributes in said learning data to an instance table presented with symbols;

selecting a Rule Induction rule from the translated instance table; and classifying the selected Rule Induction rule into specified groups.

5. A method of automatically generating a neural network model according to claim 4, wherein said step of inducing comprises a step of:

outputting dividing point information denoting said instance table and domains of symbols which represent said instance table.

6. A method of automatically generating a neural network model according to claim 5, wherein said step of outputting the dividing point information comprises a step of:

generating a group-by rule and dividing point information from a dividing method option and said learning data for selecting a method of outputting said dividing point information.

7. A method of automatically generating a neural network model according to claim 5, wherein said step of outputting the dividing point information comprises the steps of:

dividing numerical attribute data in said learning data into a plurality of segmental data by delimiting the data at specified positions for respective attributes; and allocating specified labels to the respective divided segmental data.

8. A method of automatically generating a neural network model according to claim 7, wherein said step of dividing the numerical attribute data comprises steps of:

displaying a histogram of said data for learning for each input-output variable; and designating determination of said specified positions by operating a pointer displayed superposed on said histogram.

9. A method of automatically generating a neural network model according to claim 4, wherein said step of classifying the Rule Induction rule for the respective groups comprises a step of:

classifying the Ruel Induction rule for rule, output class or total.

10. A method of automatically generating a neural network model according to claim 3, wherein said step of generating the neural network model comprises steps of:

selecting input-output variables to be used for respective rules for respective groups from said group-by rules; and generating the initial neural network model from input-output variables of the selected rules.

11. A method of automatically generating a neural network model according to claim 10, wherein said step of generating the initial neural network model comprises steps of:

determining a structure of an existing model from said group-by input-output variables; and generating the initial neural network model according to the determined structure.

12. A method of automatically generating a neural network model according to claim 3, wherein said step of generating the learning data with group information comprises a step of:

generating the learning data with group information in which the information of a group to which each data belongs is presented to each learning data from said learning data, dividing point information and group-by rule.

13. A method of automatically generating a neural network model according to claim 3, wherein said step of learning the initial neural network model comprises the steps of:

translating said learning data with group information to values included for a specified segment suited for learning of a weight which is a coupling factor between neurons of the neuron network model; and learning said weight according to a back propagation method by using the translated learning data.

14. A method of automatically generating a neural network model according to claim 13, wherein said step of translating the learning data with group information to said values included in the specified segment comprises a step of:

standardizing numerical data in said learning data with group information to real numbers included in a specified segment.

15. A method of automatically generating a neural network model according to claim 13, wherein said step of learning the weight according to the back propagation method comprises a step of:

learning a weighting factor which is a coupling strength between the neurons of the initial neural network model according to the back propagation method by using the learning data with format post-translation included in a specified segment suited for learning.

16. A method of automatically generating a neural network model according to claim 3, wherein said step of generating the initial neural network model comprises steps of:

selecting the group-by input-output variables from said group-by rules; and generating the initial neural network model from the selected input-output variables.

17. A method of automatically generating a neural network model according to claim 3, wherein said step of learning the initial neural network model comprises a step of:

generating a post-learning neural network model from said learning data with group information and said initial neural network model.

* * * * *